June 8, 1954  E. V. RUGGLES  2,680,300
SHAFT GAUGE

Filed June 8, 1950  2 Sheets-Sheet 1

ERNEST V. RUGGLES
INVENTOR.

BY Lyon & Lyon
ATTORNEYS

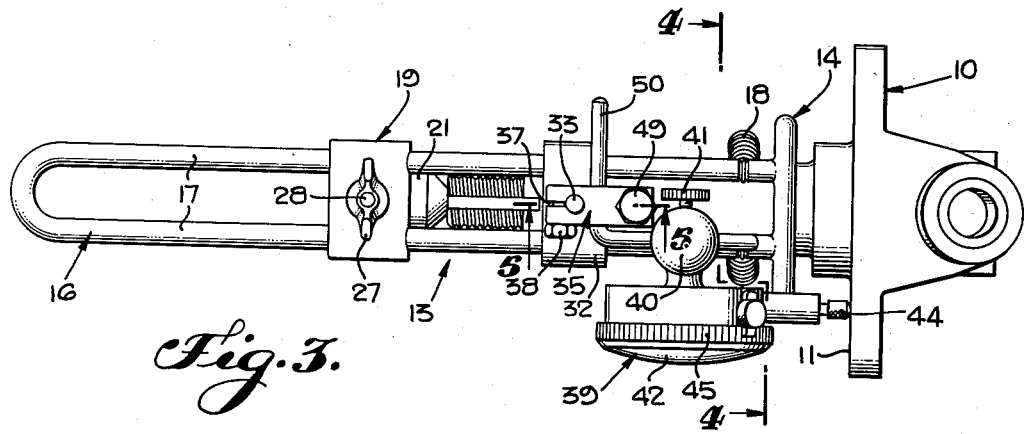
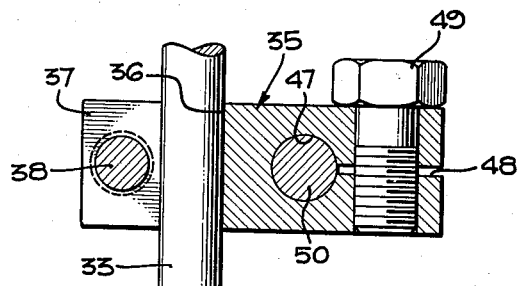
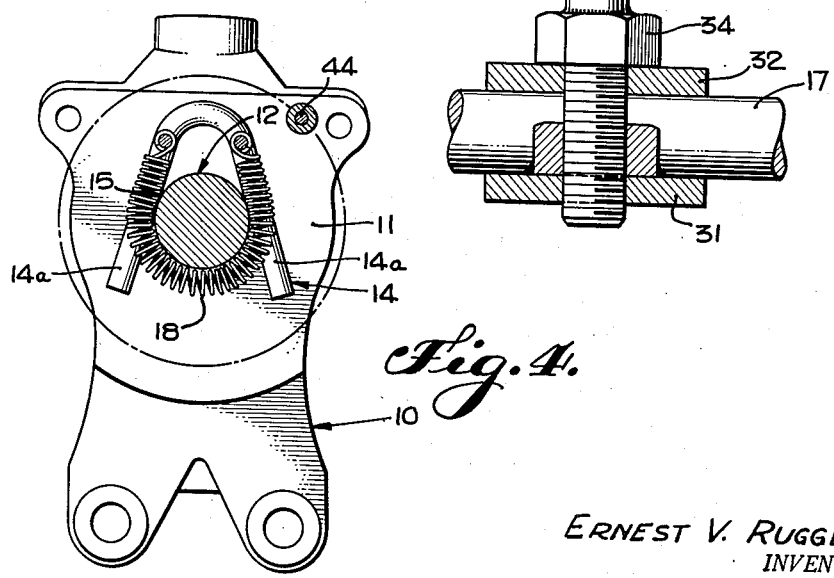
Ernest V. Ruggles
INVENTOR.
BY Lyon & Lyon
ATTORNEYS.

Patented June 8, 1954

2,680,300

UNITED STATES PATENT OFFICE 2,680,300

SHAFT GAUGE

Ernest V. Ruggles, Ventura, Calif.

Application June 8, 1950, Serial No. 166,817

3 Claims. (Cl. 33—193)

This invention relates to gauges and has particular reference to gauges for use in testing axle spindles, shafts and the like.

One of the important objects of my invention is to provide a novel device of the class indicated by means of which the alignment of a shaft or the like may be quickly and easily determined.

Another object of my invention is to provide an alignment gauge which may be used in testing axle spindles without disassembly of the spindles from the vehicle.

Another object of my invention is to provide a gauge device which is adapted for use in testing the trueness of a face plate or a transverse member with which a shaft or the like is connected.

Another object of my invention is to provide a device of the class indicated in which the centering bore or hole at the end of the shaft to be tested is utilized as a reference and support location.

A further object of my invention is to provide an alignment gauge for shafts and the like which is of simple, rugged construction, inexpensive to manufacture, yet which is highly accurate in operation.

Other objects and advantages of this invention it is believed will be apparent from the following detailed description of a preferred embodiment thereof as illustrated in the accompanying drawing.

In the drawings:

Figure 3 is a plan view of the gauge device, illustrated in position on the spindle of an automobile, with the dial indicator mounted for testing of the steering knuckle face plate.

Figure 4 is a sectional elevation taken substantially on the lines 4—4 of Figure 3.

Figure 5 is a sectional elevation taken substantially on the lines 5—5 of Figure 4.

Figure 1:
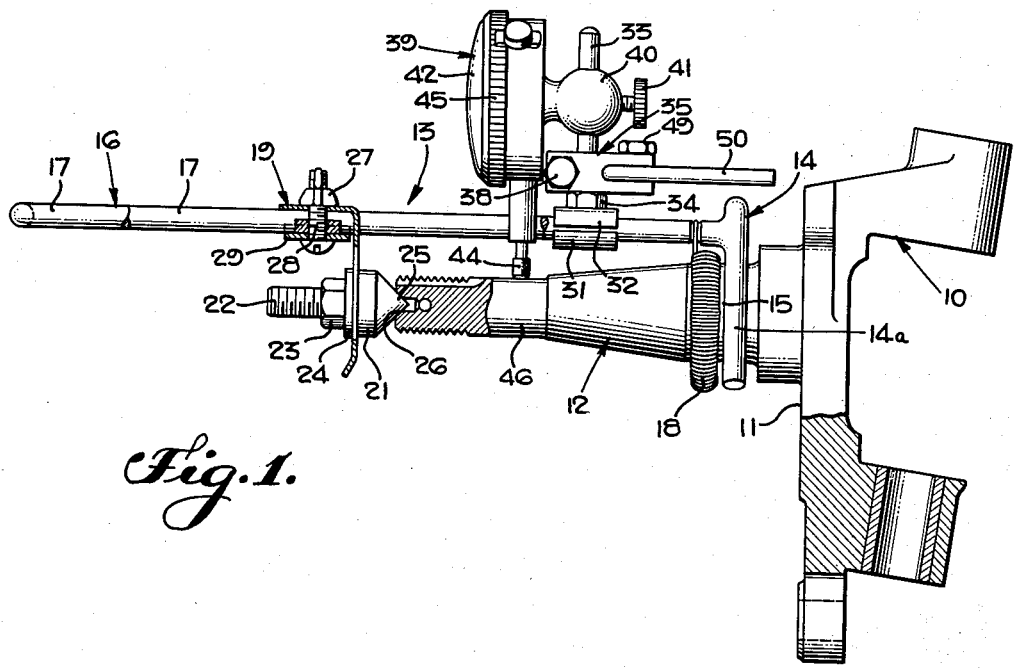
Figure 1 is a side elevation, partly in section, of a preferred embodiment of my invention, illustrated in position on the spindle of an automobile.

Referring now to the drawings, the steering knuckle of an automobile is shown and includes a sleeve or knuckle 10 having a face plate 11 substantially normal to the axis of a spindle 12 which projects horizontally and outwardly therefrom. While I prefer to describe my invention as used in the testing of automobile axle spindles, and while it is particularly adapted for that purpose, it is, of course, not inherently so limited. My invention may be used in the testing of any shaft or bearing surface provided with a centering hole, being especially suitable where the work to be tested is connected to the machine or apparatus of which it is a part and where disassembly for testing in a lathe would require considerable labor and expensive equipment.

Figure 2:
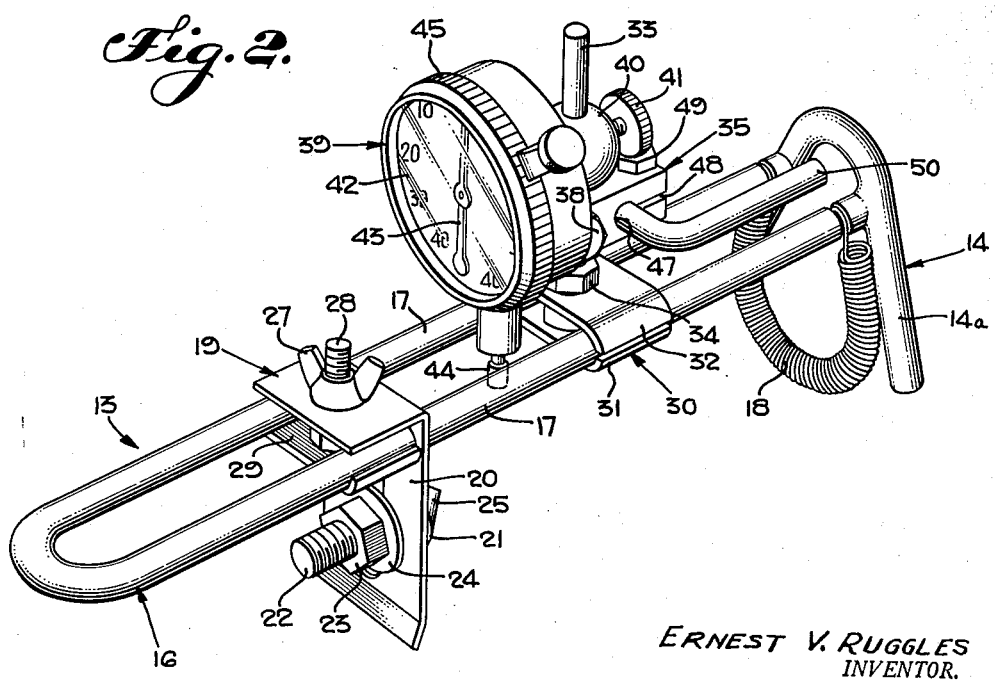
Figure 2 is a perspective view of the gauge device embodying my invention.

A preferred embodiment of my invention is illustrated best in Figures 1 and 2 in which the gauge device, generally indicated 13, is shown mounted on the spindle 12. The device is supported at one end by a yoke member 14 having a pair of diverging arms 14a which seat on the inner bearing surface 15 of the spindle 12. A U-shaped frame member 16 has a pair of legs 17 which are secured to the yoke member 14 by any convenient means such as welding, and which extend outwardly at substantially right angles from the yoke. Means are provided to frictionally maintain the yoke 14 engaged on the bearing surface 15, and as shown in the drawings this means may include the coil spring 18, one end of which is connected to each of the legs 17 to form a sling about the bearing surface 15.

Means are provided to support the outer end of the gauge device 13, and as shown in the drawings this means may include the L-shaped clamp 19 slidably supported on the legs 17 and having a transversely-extending leg 20. A conical plug member 21 provided with an axial threaded portion 22 extending through an aperture in the leg 20 is maintained on the leg by means of nut 23 and washer 24. The free end 25 of the plug is adapted to be inserted into the axial centering bore or hole 26 in the outer end of the spindle 12. The clamp 19 may be moved to any position on the frame 16 and held securely in the desired position by means of a wing nut 27 threadedly engaged with the threaded element 28 carried on the lower clamp plate 29.

A gauge clamp unit 30 is mounted on the frame 16 in a position between the clamp 18 and yoke 14. The clamp unit includes a pair of clamp plates 31 and 32 with a post 33 threadedly secured to the plate 31 and extending through an aperture in the upper plate 32. A hexagonal member 34 may be secured to the post 33 above the plate 32 to provide means for turning the post to tighten or release the clamp unit 30. A support block 35 (described in more detail below) is mounted on the post 33 through aperture 36. The block is provided with a split end 37 having a bolt 38 so that the block may be held in any position on the post.

A dial gauge or indicator 39 having a stem 40 is slidably supported on the post 33, the gauge being held in place by means of a set screw 41 in the end of the stem 40. The dial gauge is a conventional instrument having a graduated face 42 and a pointer 43 adapted to swing about the face when the spring-loaded stylus or foot 44 is pushed inwardly toward the body of the gauge. The dial or face 42 is mounted on a revolvable ring 45 which provides for the setting of the dial to give a zero reading regardless of the position of the foot 44.

In operation, the device is placed on the spindle in the position shown in Figures 1 and 2, with the foot 44 of the dial gauge 39 resting radially on the outer bearing surface 46 of the spindle. The dial may be set to give a zero reading by rotating the ring 45. The device is then rotated about the spindle 12 by grasping the outer end of the frame 16 and turning slowly, while at the same time gently pressing inwardly and longitudinally, so as to maintain the plug 21 in engagement in the centering bore 26. The gauge stylus 44 will thus be carried around the bearing surface 46, and any misalignment between the inner bearing surface 15 and outer bearing surface 45 will be evidenced by a deflection of the pointer. It will be understood from the above description that spindles, shafts and the like of various sizes may be tested with my device, since ready adjustment of the plug 25 and dial gauge 39 is provided.

Means are provided for testing the trueness and perpendicularity of the face plate 11 with respect to the axis of the spindle 12. As shown in the drawings, these means may include the above-mentioned support block 35. The end of the block remote from the post 33 is provided with an aperture 47, split 48 and bolt 49 for adjustably supporting the L-shaped rod 50. As shown in Figures 3 and 4, the dial gauge 39 may be removed from the post 33 and mounted on the rod 50 with the stylus 44 resting on the surface of the face plate 11. The device may then be rotated in the same manner as described above, any imperfections in the face plate being indicated by deflections of the pointer 43.

While I have shown and described specific embodiments of my invention, I do not limit myself to the exact details of the constructions set forth, and the invention embraces such changes, modifications and equivalents of the parts and their formation and arrangement as come within the purview of the appended claims.

I claim:

1. In a device for testing the alignment of shafts and the like of the type having an axial centering bore at one end thereof, the combination of a U-shaped frame rotatable about the shaft and having a pair of substantially parallel legs; a transverse yoke member welded to the ends of said legs, said yoke member having a pair of diverging arms adapted to contact the shaft; means frictionally maintaining the yoke member in contact with the shaft, said means comprising a resilient member secured to said frame and embracing said shaft; a first clamp member adjustably mounted for slidable movement along said frame legs, said clamp member having a transverse leg, a conical plug member mounted on said transverse leg having an axis parallel to said legs and adapted to be engaged in the axial centering bore whereby said frame may be supported substantially parallel to the axis of said shaft; a gauge clamp member adjustably mounted for slidable movement along said frame legs intermediate said yoke and said first clamp member, said gauge clamp member having a transversely-extending post attached thereto; and a dial gauge mounted on said post, said gauge having a spring-loaded stylus adapted to ride about the surface of the shaft as the frame is rotated about the shaft.

2. In a device for testing the alignment of shafts and the like of the type having an axial centering bore at one end thereof and a plane surface normal to the axis of said shaft, the combination of a U-shaped frame rotatable about the shaft and having a pair of substantially parallel legs; means frictionally maintaining one end of the frame in contact with the shaft; a first clamp member adjustably mounted for slidable movement along said frame legs, said clamp member having a transverse leg; a conical plug member mounted on said transverse leg having an axis parallel to said legs and adapted to be engaged in the axial centering bore whereby said frame may be supported substantially parallel to the axis of said shaft; a gauge clamp member adjustably mounted for slidable movement along said frame legs intermediate said yoke and said first clamp member, said gauge clamp member having a transversely extending post attached thereto; a support block mounted on said post; a rod carried on said support block, said rod extending substantially parallel to the axis of said shaft; and a dial gauge mounted on said rod, said gauge having a spring-loaded stylus adapted to ride on said plane surface as the frame is turned about the shaft.

3. In a device for testing the alignment of shafts and the like of the type having an axial centering bore at one end thereof and a plane surface normal to the axis of said shaft, the combination of a U-shaped frame rotatable about the shaft and having a pair of substantially parallel legs; a transverse yoke member welded to the ends of said legs, said yoke member having a pair of diverging arms adapted to contact the shaft; means frictionally maintaining the yoke member in contact with the shaft, said means comprising a resilient member secured to said frame and embracing said shaft; a first clamp member adjustably mounted for slidable movement along said frame legs, said clamp member having a transverse leg; a conical plug member mounted on said transverse leg having an axis parallel to said legs and adapted to be engaged in the axial centering bore whereby said frame may be supported substantially parallel to the axis of said shaft; a gauge clamp member adjustably mounted for slidable movement along said frame legs intermediate said yoke and said first clamp member, said gauge clamp member having a transversely-extending post attached thereto; a support block mounted on said post; a rod carried on said support block, said rod extending substantially parallel to the axis of said shaft; and a dial gauge mounted on said rod, said gauge having a spring-loaded stylus adapted to ride on said plane surface as the frame is turned about the shaft.

References Cited in the file of this patent

UNITED STATES PATENTS

| Number | Name | Date |
| --- | --- | --- |
| 725,411 | Compliment et al. | Apr. 14, 1903 |
| 1,674,417 | Thayer et al. | June 19, 1928 |
| 1,825,988 | Wochner | Oct. 6, 1931 |
| 1,997,639 | Hetherington et al. | Apr. 16, 1935 |
| 2,066,699 | Skelton | Jan. 5, 1937 |
| 2,235,383 | O'Donnell | Mar. 18, 1941 |
| 2,508,251 | Ingle | May 16, 1950 |
| 2,545,784 | Kenner | Mar. 20, 1951 |